D. COBB & C. H. SHAW.
UMBRELLA HOLDER FOR CORN PLOWS.
APPLICATION FILED FEB. 9, 1911. RENEWED FEB. 6, 1913.
1,072,574.  Patented Sept. 9, 1913.
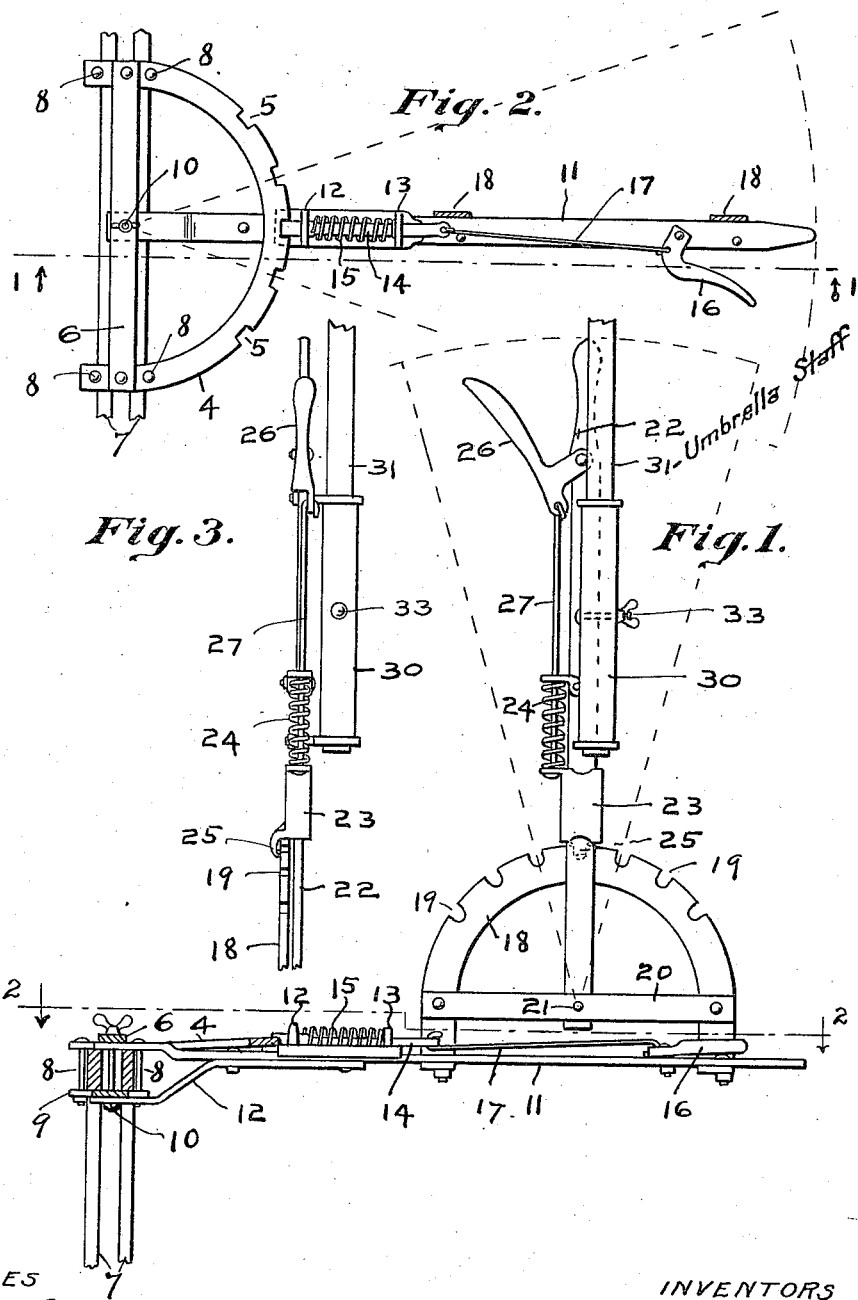
WITNESSES
W. L. Bushong.
L. B. Woerner.
INVENTORS
Dillard Cobb and
Clethie H. Shaw.
By Minturn & Woerner
ATTORNEYS.

UNITED STATES PATENT OFFICE.

DILLARD COBB AND CLETHIE H. SHAW, OF NINEVEH, INDIANA, ASSIGNORS TO SUNSHINE SPECIALTY MANUFACTURING COMPANY, A CORPORATION OF INDIANA.

UMBRELLA-HOLDER FOR CORN-PLOWS.

1,072,574. Specification of Letters Patent. Patented Sept. 9, 1913.

Application filed February 9, 1911, Serial No. 607,685. Renewed February 6, 1913. Serial No. 746,666.

*To all whom it may concern:*

Be it known that we, DILLARD COBB and CLETHIE H. SHAW, citizens of the United States, residing at Nineveh, in the county of Johnson and State of Indiana, have invented certain new and useful Improvements in Umbrella-Holders for Corn-Plows, of which the following is a specification.

This invention relates to improvements in means for holding an umbrella, and has special reference to such use in connection with farm implements where the operator is permitted to ride, as on riding cultivators, plows, mowers, and the like, but as the device may be applied to advantage on other machines we do not desire to limit its use to any particular machinery.

The object of the invention is to provide a firm and strong umbrella support which may be quickly adjusted in the direction of travel or transversely thereto, to suit the changed relation of the operator with the sun at each change of travel at the end of every row whereby the umbrella may be kept constantly between the operator and the sun in all directions of travel and at all times of day.

We accomplish the object of the invention by the mechanism illustrated in the accompanying drawing, in which—

Figure 1 is a view in side elevation of our invention, applied to the arch of a cultivator, the latter being shown in vertical section. Fig. 2 is a horizontal section on the line 2—2 of Fig. 1, and Fig. 3, a rear elevation of the vertical lever shown in Fig. 1, Like characters of reference indicate like parts throughout the several views of the drawings.

4 represents a semicircular strap-iron segment, having notches 5 in its outer periphery, and 6 a diametrical bar connecting the ends of the segment. The device is here shown as attached to the arch 7 of a riding cultivator, the arch being in two parallel bars as shown. The segment 4 above the arch bars 7, is clamped to the latter by bolts 8 passing through segment 4 and through short bars 9 placed under the arch.

At the center of curvature of segment 4 is a bolt 10 forming a pivot for the attachment of a horizontal adjustable lever 11, and to strengthen this attachment of the lever it is supplemented with an underside brace 12 the forward end of which is bolted to the lever 11 and the rear end connected with the pivot bolt 10.

Extending upwardly from the lever 11 is a pair of spaced-apart ears 12 and 13 each having holes through which a bolt 14 is passed. This bolt is pressed by a spring 15 longitudinally of the lever 11 into contact with the notched segment 4, and its end is adapted to enter one of the notches in the segment when brought into alinement therewith. A hand-lever 16, pivoted to the lever 11 near its outer end, is connected by rod 17 with the adjacent end of bolt 14 to permit the latter, serving as a pawl or dog, to be disengaged from the segment by pressing the lever 16. This permits the lever 11 to be moved horizontally in the directions indicated by dotted lines in Fig. 2.

Attached to the lever 11 is a second semicircular strap-iron segment 18 having outer edge notches 19. A diametrical bar 20 has a pivot 21 at the center of curvature of this bar for the vertically adjustable attachment of a vertical lever 22. A sleeve 23 is slidingly mounted on the lever 22 and is pressed normally toward the segment 18 by a spring 24. The sleeve has a lug 25 which enters one of the notches of the segment 18 when brought into alinement therewith.

A hand lever 26, pivoted to the vertical lever 22 near the outer end of the latter, is connected by a rod 27 with the sleeve 23 to raise the latter out of engagement with the notched segment. The vertical adjustments of the lever 22 are indicated by dotted lines in Fig. 1.

Secured rigidly to the vertical lever 22 is a sleeve 30 preferably open at both ends, and extending longitudinally of lever 22. 31 is the staff or handle of an umbrella which is inserted in sleeve 30 and is retained at a given position therein by a bolt 33 which passes through the walls of the sleeve and through a transverse hole in the staff. By having a number of holes at various distances along the staff the latter may be adjusted in position in said sleeve.

The vertical and horizontal adjustments of the two levers 11 and 22 enable an umbrella carried by the sleeve 30 to be tilted at any angle or moved toward or from the person using it to keep it directly between him and the sun and out of his way so as not to interfere with his work. The adjustments may also be quickly changed in the manner already described.

Having thus fully described our invention what we claim as new and wish to secure by Letters Patent is—

In an umbrella holder, a horizontal semi-circular rack-bar notched in its outer edge, a bar extending diametrically of the rack-bar and secured to the ends of the latter, a horizontal hand lever passing under the rack-bar and bent upwardly to a level with the under side of said diametrical bar, a brace-bar secured to said hand lever and extended downwardly and rearwardly to embrace a support between it and the said lever, a pivot passing through the diametrical bar lever and brace, a pawl carried by said lever, a vertical semi-circular rack secured to the horizontal lever and having a diametrical bar, said rack having notches in its outer edge, a second lever pivoted to said last bar, a pawl carried by the second lever, the pawls of the two levers adapted to enter notches of their respective segments to hold a given adjustment of said levers, a sleeve carried by the second lever to receive the staff of an umbrella and means for securing the staff in said sleeve.

In witness whereof, we have hereunto set our hands and seals at Nineveh, Indiana, this 23rd day of January, A. D. one thousand nine hundred and eleven.

DILLARD COBB. [L. S.]
CLETHIE H. SHAW. [L. S.]

Witnesses:
FRANK KEATON,
CARL A. FORSYTH.

Copies of this patent may be obtained for five cents each, by addressing the " Commissioner of Patents. Washington, D. C."